(12) United States Patent
Nitta

(10) Patent No.: US 6,400,731 B1
(45) Date of Patent: Jun. 4, 2002

(54) VARIABLE RATE COMMUNICATION SYSTEM, AND TRANSMISSION DEVICE AND RECEPTION DEVICE APPLIED THERETO

(75) Inventor: Tatsuo Nitta, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/198,563

(22) Filed: Nov. 23, 1998

(30) Foreign Application Priority Data

Nov. 25, 1997 (JP) .............................................. 9-322926

(51) Int. Cl.[7] .................................................. H04J 3/16
(52) U.S. Cl. ........................ 370/468; 370/342; 714/795
(58) Field of Search ................................ 370/465, 468, 370/342, 335, 441, 320, 479, 349, 345, 431; 375/341, 262; 714/746, 795, 752, 780, 774

(56) References Cited

U.S. PATENT DOCUMENTS

| 5,898,696 | A | * | 4/1999 | Proctor ........................ 370/468 |
| 6,112,325 | A | * | 8/2000 | Burshtein ................... 714/774 |
| 6,233,230 | B1 | * | 5/2001 | Chan ............................ 370/335 |
| 6,272,123 | B1 | * | 8/2001 | Abe ............................. 370/342 |

* cited by examiner

Primary Examiner—Douglas Olms
Assistant Examiner—Ricardo M. Pizarro
(74) Attorney, Agent, or Firm—Banner & Witcoff, Ltd.

(57) ABSTRACT

A variable rate communication system comprises a transmission device capable of selectively using one of a predetermined plurality of data rates for each frame determined in stages, and a reception device capable of receiving data transmitted by the plurality of data rates, in which the transmission device comprises data rate decision section decides a data rate used with the latest frame to one of data rates used with the frame immediately before and a different data rate from a data rate used with the frame immediately before by one stage, and encoding section for performing a predetermined encoding processing according to the data rate decided by the data rate decision section to a transmission data, and the reception device comprises decoding section for performing a predetermined decoding processing according to the plurality of data rates to a reception data, respectively, narrowing section for narrowing a candidates of the data rates used with a received latest frame to a part of the plurality of data rates based on a data rate at least used with a frame immediately before, judgment processing section for performing a predetermined judgment processing to judge a data rate used with the latest frame as valid data rates for the narrowed data rates, and reception data selection section for selecting a reception data to which a decoding processing according to a data rate judged by the judgment processing section is performed by the decoding section as a valid reception data.

30 Claims, 8 Drawing Sheets

VARIABLE RATE COMMUNICATION SYSTEM, AND TRANSMISSION DEVICE AND RECEPTION DEVICE APPLIED THERETO

BACKGROUND OF THE INVENTION

The present invention relates to a variable rate communication system which is applied to the wireless communication system, etc., of the CDMA (Code Division Multiple Access) method, for example, and can selectively use either of a predetermined plurality of data rates determined in stages by a frame unit with a transmission device and a transmission device and a reception device used with this variable rate communication system.

A wireless communication system of a CDMA method can selectively use either of a plurality of predetermined data rates of, for example, 9600 bps, 4800 bps, 2400 bps, and 1200 bps provided in stages by a frame unit with a transmission device. After performing processing of making a convolutional code according to a selected data rate to a transmission data, the transmission device transmits data.

All Viterbi decoding processings according to each of the plural data rates are executed to a reception data on a reception side. The symbol error rate in each reception data after decoding processes is measured respectively. The data rate corresponding to the Viterbi decoding processing performed to obtain the reception data in which this symbol error rate becomes minimum among a plurality of data rates is assumed to be a correct symbol rate.

However, since the Viterbi decoding processing needs quite a lot of calculations, if the Viterbi decoding processing according to each data rate is performed to the time-division, quite a lot of time is spent in the judgment of the data rate. The judgment of the data rate can be promptly performed if the Viterbi decoding processing according to each data rate is performed in parallel. However, the consumption electric power increases in this case since the operation of a lot of processing sections are operated at the same time.

As mentioned above conventional system, since the decoding processing according to all the data rates must be performed respectively on the reception side, there are disadvantages that the processing time is long, and the consumption electric power is large.

BRIEF SUMMARY OF THE INVENTION

An object of the present invention is to provide a variable rate communication system and a transmission device and a reception device applied thereto which reduce the amount of processings for judgment of the data rate, and can shorten a time required to judge the data rate and decrease a consumption electric power.

To achieve the above-mentioned object, a variable rate communication system according to the present invention comprises a transmission device capable of selectively using one of a predetermined plurality of data rates for each frame determined in stages; and a reception device capable of receiving data transmitted by the plurality of data rates, in which the transmission device comprises: data rate decision means decides a data rate used with the latest frame to one of data rates used with the frame immediately before and a different data rate from a data rate used with the frame immediately before by one stage; and encoding means for performing a predetermined encoding processing according to the data rate decided by the data rate decision means to a transmission data, and the reception device comprises: decoding means for performing a predetermined decoding processing according to the plurality of data rates to a reception data, respectively; narrowing means for narrowing a candidates of the data rates used with a received latest frame to a part of the plurality of data rates based on a data rate at least used with a frame immediately before; judgment processing means for performing a predetermined judgment processing to judge a data rate used with the latest frame as valid data rates for the narrowed data rates; and reception data selection means for selecting a reception data to which a decoding processing according to a data rate judged by the judgment processing means is performed by the decoding means as a valid reception data. For example, the encoding means is a convolutional coding processing etc. The decoding processing is, for example, a Viterbi decoding processing etc., and the decoding means consists of, for example, a plurality of Viterbi decoders.

Since the transmission device determines the data rates used with the latest frame in either a data rate used with the frame immediately before or different data rate from a data rate used with the frame immediately before by one stage, the reception device can narrow the candidate of the data rates used with the received latest frame partially of the plurality of data rates based on the data rate at least used with the frame immediately before. Therefore, the processing amount of the judgment processing is decreased by performing the predetermined judgment processing for judging the data rate used for the latest frame for only this narrowed data rate.

Another present invention is to provides a reception device, which receives a frame transmitted from a transmission device which is selectively usable one of a plurality of predetermined data rates defined in stages for each frame, comprising: priority setting means for setting a priority to the data rates narrowed by the narrowing means; re-encoding means for performing a predetermined encoding processing according to each of the plurality of data rates to the reception data, respectively; re-encoding means for performing the encoding processing according to each of the plurality of data rates to the reception data after the decoding processing according to the same data rate is performed by the decoding means, respectively; data rate judgment means for obtaining an error rate to the received data before decoding by the decoding means regarding to the re-encoded data re-encoded by the re-encoding means, and for judging a data rate corresponding to the encoding processing performed to obtain the re-encoded data as a data rate which is used with the latest frame when this error rate is smaller than a predetermined value; data rate judgment control means for setting one of the plurality of data rates in a test rate, and for making a decoding processing and a re-encoding processing according to the test rate, and a judgment processing by the data rate judgment means until the data rate used with the latest frame is judged by the data rate judgment means with changing in order with a high priority to which the data rate to be a test rate is set by the priority setting means; and reception data selection means for selecting a reception data to which a decoding processing according to a data rate judged by the judgment processing means is performed by the decoding means as a valid reception data. For example, the re-encoding means is a convolutional coding processing etc. For example, the reception data selection means consists of a buffer and a reception data output control means.

Since the judgment processing whether it is a data rate used with the latest frame need not be performed concerning all the data rates even if the lowest rank priority is set to the data rate used with the latest frame, the amount of processing is decreased. Moreover, since the priority is set based on the data rate at least used with the frame immediately before, a relatively high-ranking priority can be set to the data rate used with the latest frame in many cases, and the judgment processing whether it is a data rate used with the latest frame only to very few data rates may be performed.

As described above, according to the present invention, it becomes possible to reduce the processing amount for the judgment of the data rate, to achieve shortening time which requires to judge the data rate and to decrease the power consumption.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
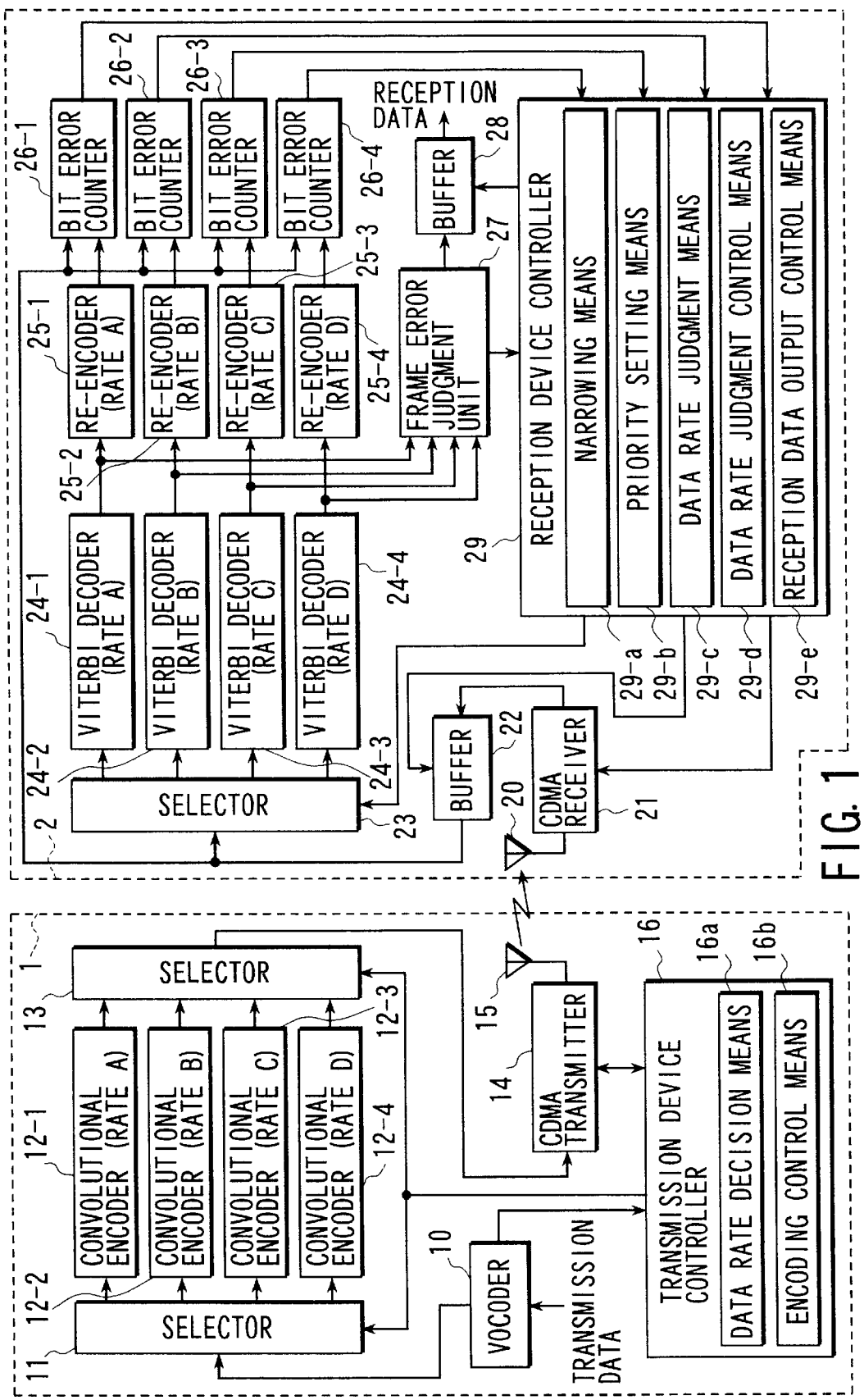
FIG. 1 is a function block diagram showing a main structure of a CDMA wireless communication system constructed by applying a communication system according to the first embodiment of the present invention.

Hereinafter, an embodiment of the present invention will be explained referring to the drawings.
(First Embodiment)
FIG. 1 is a function block diagram showing a main structure of a CDMA wireless communication system constructed by applying a communication system according to the first embodiment of the present invention.

This CDMA wireless communication system performs a wireless communication by a CDMA method between a transmission device 1 and a reception device 2.

The transmission device 1 has a vocoder 10, a selector 11, a plurality of convolutional encoders 12 (Four encoders of 12-1 to 12-4 in this embodiment), a selector 13, a CDMA transmitter 14, an antenna 15, and a transmission device controller 16.

The vocoder 10 receives the transmission data of the voice data etc. for example, and performs the compression encoding to the transmission data. And, the vocoder 10 gives the transmission data after encoding to the selector 11. The vocoder 10 judges voice rate in the transmission data, and notifies a result to the transmission device controller 16.

The selector select one of the convolutional encoders 12-1 to 12-4 under the control of the transmission device controller 16.

The convolutional encoder 12 performs the convolutional coding processing to the transmission data given through the selector 11. Where, the convolutional encoders 12-1 to 12-4 corresponds to different data rates of a data rate A, a data rate B, a data rate C, and a data rate D, respectively, and performs the convolutional coding processing corresponding to the corresponding data rate to the transmission data, respectively. And, the convolutional encoder 12 outputs the transmission data after the convolutional coding to the selector 13. Each data rate is set to become a relationship of the data rate A>the data rate B>the data rate C>the data rate D in stages in this embodiment.

The selector 13 selects the convolutional encoder 12 selected by the selector 11 under the control of the transmission device controller 16. And, the selector 13 gives the transmission data which the selected convolutional encoder 12 outputs to the CDMA transmitter 14.

The CDMA transmitter 14 performs well-known processing for the wireless transmission of a spectrum diffusion processing and a digital modulation (for example, QPSK modulation), etc. to the transmission data given through the selector 13, obtains the transmission signal, supplies this to the antenna 15, and performs the wireless transmission from the antenna 15 to the electric wave.

The transmission device controller 16 achieves an operation as the transmission device by totally controlling each section of this transmission device 1. This transmission device controller 16 has the microprocessor for example as a main control circuit, and has data rate decision means 16a and encoding control means 16b in addition to the well-known control means to enable the wireless communication by the CDMA method.

The data rate decision means 16a selectively decides a data rate from among the data rate A to the data rate D based on a notified voice rate from the vocoder 10 and the data rate (hereinafter, called the previous frame rate as follows) selected with a previous frame in each frame of the data rate. The encoding control means 16b switches and controls the selectors 11 and 13 to perform the convolutional coding processing to the convolutional encoder 12 which corresponds to the data rate decided depending on the data rate decision means 16a.

On the other hand, the reception device 2 has an antenna 20, a CDMA receiver 21, a buffer 22, a selector 23, Viterbi decoders 24 (24-1 to 24-4) which correspond to each of the data rate A to the data rate D, re-encoders 25 (25-1 to 25-4) which correspond to each of the data rate A to the data rate D, bit error counters 26, (26-1 to 26-4) which corresponds to each of the re-encoder 25, a frame error judgement unit 27, a buffer 28, and a reception device controller 29.

The electric wave that the wireless transmission is performed from the antenna 15 of the transmission device 1 is received with the antenna 20, is converted into an electric reception signal, and is given to the CDMA receiver 21.

The CDMA receiver 21 performs a well-known reception processing of a digital demodulator (for example, QPSK demodulator) and a spectrum reverse-diffusion processing, etc. to the reception signal given from the antenna 20 to obtain the reception data, and gives this data to the buffer 22.

The buffer 22 holds the reception data for one frame until the reception data of the following frame is given from the CDMA receiver 21, gives this held reception data under the control of the reception device controller 29 to the selector 23 and the bit error counter 26, respectively.

The selector 23 selects one of the Viterbi decoders 24-1 to 24-4 under the control of the reception device controller 29. And, the selector 23 gives the reception data given from the buffer 22 to the selected Viterbi decoder 24.

The Viterbi decoder 24 performs the Viterbi decoding processing according to the corresponding data rate to the reception data given through the selector 23, respectively. And, the Viterbi decoder 24 gives the reception data after decoding, respectively, to the re-encoder 25 and the frame error judgement unit 27 corresponding to the same data rate as oneself.

The re-encoder 25 performs the same convolutional coding processing as the processing which convolutional encoder 12 corresponding to the same data rate as oneself, to the reception data given from the Viterbi decoder 24 corresponding to the same data rate as oneself. That is, the re-encoder 25 re-encodes the reception data decoded once by the Viterbi decoder 24 corresponding to oneself, respectively. And, the re-encoder 25 gives the reception data re-encoded to the bit error counter 26 corresponding to oneself.

The bit error counter 26 holds the reception data (reception data before decoding) given from the buffer 22, judges whether an error for the held reception data in the reception data after re-encoding given from the re-encoder 25 corresponding to oneself is the same or not to compare positive or negative for each bit, that is, detects the error by the error judgment of each bit, and measures the symbol error rate by counting the error. And, the bit error counter 26 notifies the reception device controller 29 the measured symbol error rate, respectively.

The frame error judgement unit 27 judges the presence of the frame error by, for example, the CRC check concerning the reception data after decoding given from the Viterbi decoder 24 selected with the selector 23, and gives the reception data to the buffer 28 without change. And, the frame error judgement unit 27 notifies the reception device controller 29 the judgment result of the presence of the frame error.

The buffer 28 holds the reception data for one frame given from the frame error judgement unit 27 until the reception data of the following frame is given. And, the buffer 28 outputs this held reception data as reception data correctly decoded under the control of the reception device controller 29.

The reception device controller 29 achieves the operation as the reception device by totally controlling each section of the reception device 2. This reception device controller 29 has, for example, the microphone processor as a main control circuit, and has a narrowing means 29a in addition to the well-known control means to enable the wireless communication by the CDMA method, priority setting means 29b, data rate judgment means 29c, data rate judgment control means 29d, and reception data output control means 29e.

The narrowing means 29a narrows the candidate (hereafter, called as a candidate rate) of the data rate (hereinafter, called as the latest frame rate) used for the received latest frame to a part of the data rate A to the data rate D based on the data rate judged by the data rate judgment means 29c relating to the previous data rate. The priority setting means 29b sets the priority of each of the candidate rates narrowed by the narrowing means 29a in consideration of the change state of the data rate in a past frame. The data rate judgment means 29c sets one of the candidate rates to the test rate, and judges whether the test rate is the latest frame rate based on the symbol error rate measured with the bit error counter 26 and the judgment result of the frame error judgement unit 27 when the reception data is flown into the Viterbi decoder 24 and the re-encoder 25 which correspond to this test rate, and the bit error counter 26 which corresponds to the corresponding re-encoder 25. The data rate judgment control means 29d makes performing the judgment processing by the data rate judgment means 29c with changing the candidate rate assumed to be a test rate according to the priority set by the priority setting means 29b until the latest frame rate is judged. And, the reception data output control means 29e outputs the reception data held by the buffer 28 when the latest frame rate is judged by the data rate judgment means 29c.

Next, an operation of the CDMA wireless communication system as constructed above will be explained.

Figure 2:
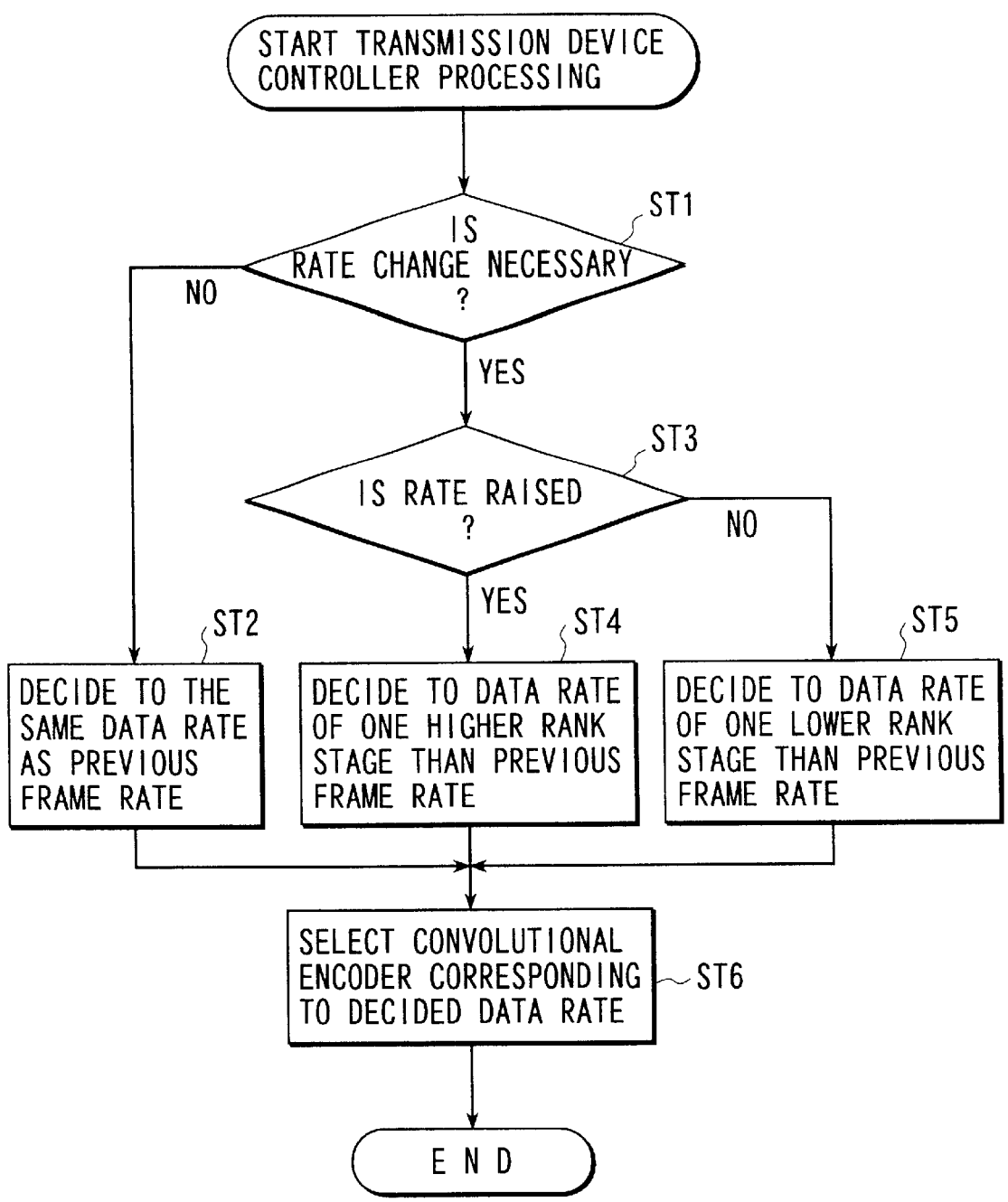
FIG. 2 is a flowchart showing a processing procedure of the transmission device controller 16 in FIG. 1.

In the transmission device 1, the transmission device controller 16, first, executes the processing shown in FIG. 2 to set the data rate used with the frame every one frame.

It is judged whether or not it is necessary to change the latest frame rate from the previous frame rate based on the amount of data (for example, voice rate) output from the vocoder 10 (step ST1). This judgment may be performed as follows. The transmission device controller 16 judges based on the amount of data. The transmission device controller 16 detects whether the frame rate is changed when the selector 11 selects a different data rate from the latest rate as a necessary rate and performs the judgment concerning the necessity of the change.

Where, the transmission device controller 16 decides the same data rate as the previous frame rate the latest frame rate if it is unnecessary to change (step ST2). In this step, since the data rate of the higher rank does not exist when the previous frame rate is a data rate with the highest rank, the latest frame rate is decided to the same data rate as the previous frame rate. Since the data rate of lower rank does not exist when the previous frame rate is a data rate with the lowest rank, the latest frame rate is decided to the same data rate as the previous frame rate, similarly.

The transmission device controller 16 judges whether the latest frame rate should be raised to the previous frame rate in step ST2 when judged that it is necessary to change (step ST3).

When the latest frame rate should be raised to the previous frame rate, the transmission device controller 16 decides the latest frame rate to a high-ranking data rate from the previous frame rate only by one stage (step ST4). When the latest frame rate should be lowered to the previous frame rate, the transmission device controller 16 decides the latest frame rate to the low-ranking data rate from the previous frame rate only by one stage (step ST5).

After deciding the latest frame rate in either of step ST2, step ST4 or step ST5, the transmission device controller 16 controls the selectors 11 and 13, and selects the convolutional encoder 12 corresponding to the data rate decided as the latest frame rate (step ST6).

The step ST1 to the step ST5 is executed by the data rate decision means 16a, and, the step ST6 is executed by the encoding control means 16b, respectively, among the above-mentioned processings.

Figure 3:
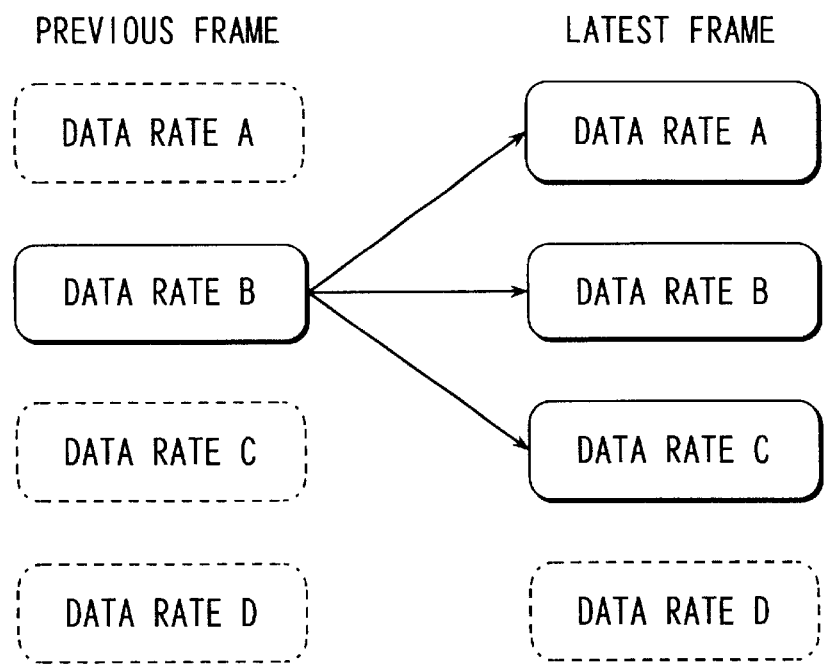
FIG. 3 is a figure showing a sample of a decision state of the use data rate by the transmission device controller 16 in FIG. 1.

The latest frame rate is selected from the same data rate as the previous frame rate, or different data rate from the previous frame rate only by one stage. Specifically, for example, if the previous frame rate is rhw data rate B as show in FIG. 3, the latest frame becomes either of the data rate A, the data rate B or the data rate C, and the different data rate D from the data rate B by two stages is not selected.

The transmission data after performing a compression encoding by the vocoder 10 is given through selector 11 to the convolutional encoder 12 corresponding to the data rate decided as the latest frame rate as described above, and is given to the CDMA transmitter 14 through the selector 13 after the convolutional coding processing is performed. In the CDMA transmitter 14, the transmission signal is obtained by performing processings such as a spectrum diffusion processing and a digital modulation to the transmission data after performing the convolutional coding processing, and is wireless-transmitted as an electric wave from the antenna.

As mentioned above, when the electric wave wireless-transmitted from the transmission device 1 reaches reception device 2, the electric wave is converted into an electric reception signal, and is given to the CDMA receiver 21. And, the reception signal is performed the reception processings such as a digital demodulator and a spectrum inverse-diffusion processing by the CDMA receiver 21 to become a reception data, and is temporarily held in the buffer 22.

Figure 4:
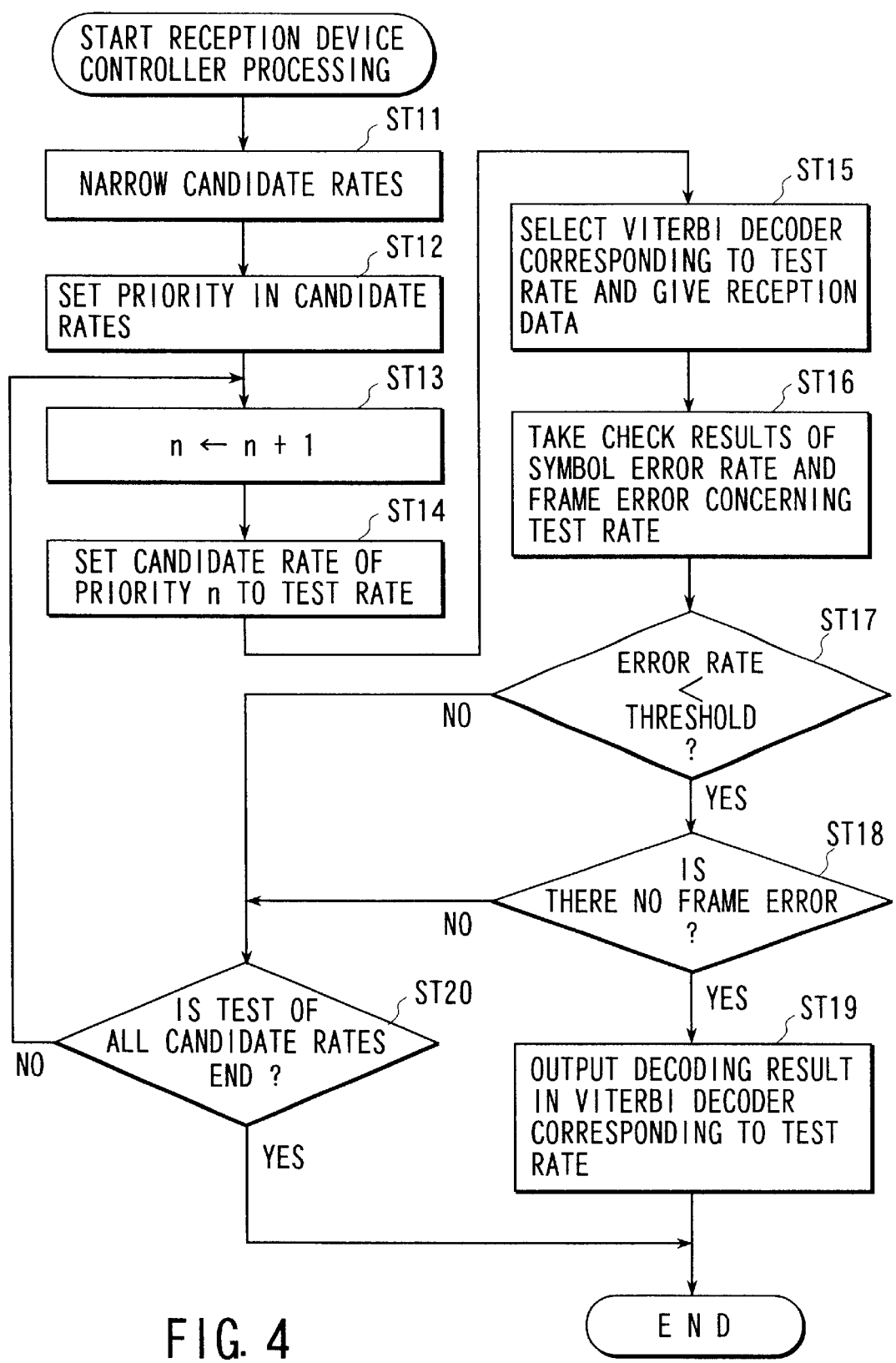
FIG. 4 is a flowchart showing a processing procedure of the reception device controller 29 in FIG. 1.

The reception device controller 29 judges the data rate used with the frame whenever the reception data of one frame is received, and executes the processing shown in FIG. 4 to obtain a correct reception data to which the Viterbi decoding according to the data rate is performed.

Figure 5:
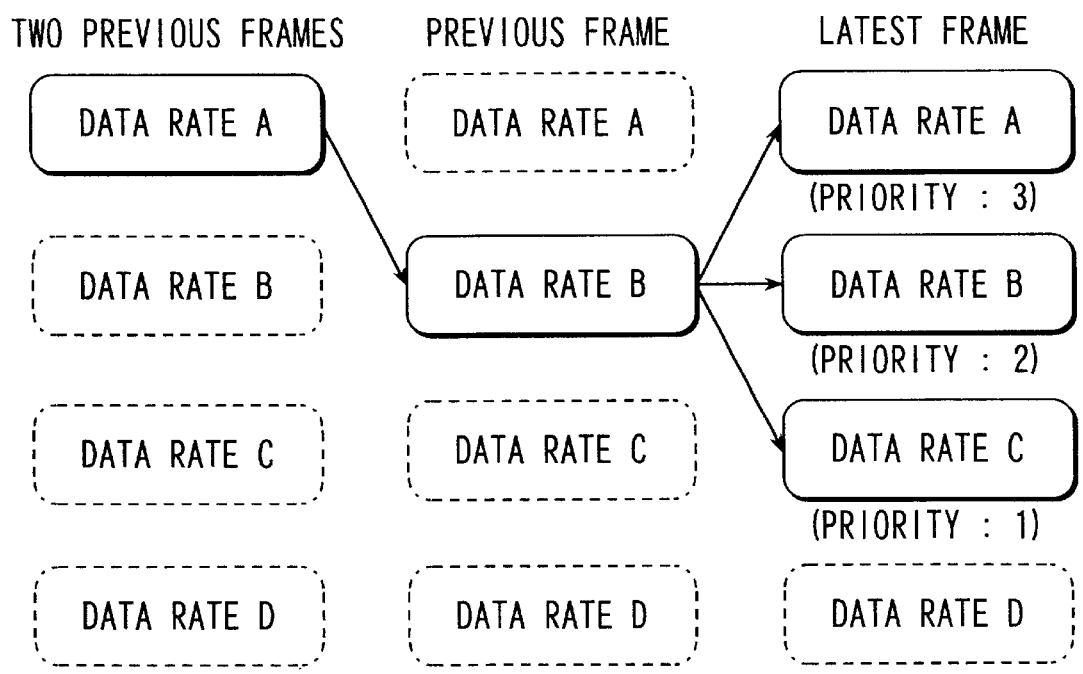
FIG. 5 is a figure showing a narrowing state of a candidate rate and an example of the setting state of the priority by the reception device controller 29 in FIG. 1.

First, the reception device controller 29 narrows the candidate rates of the latest frame rate to a part of the data rate A to the data rate D by the narrowing means 29a based on the previous frame rate (step ST11). That is, it is used that the transmission device 1 selects the same data rate as the previous frame rate or a different data rate from the previous frame rate only by one stage as the latest frame rate, the candidate rate is determined as the same data rate and previous frame rate and only a different data rate from the previous frame rate only by one stage. Specifically, the candidate rates are assumed to be the data rate A, the data rate B, and the data rate C if the previous frame rate is the data rate B, for example, as show in FIG. 5, and a different data rate D from the data rate B by two stages is excluded from the candidate rates.

Next, the reception device controller 29 sets the priority of the candidate rates, respectively, narrowed as described above according to the priority setting means 29b in consideration of the state of the change of the data rate in the past frame (step ST12). That is, for example, the tendency such that "The possibility of the data rate of the latest frame to be decreased further is high if the data rate decreases from the two previous frames to the previous frame." is obtained to the selection of the data rate with the transmission device 1, and the priority is set based on such tendency and the change state of the data rate in the past frame. As an example, a priority is set high in order of the data rate C>the data rate B>the data rate A to each data rate of the candidate rates if two previous frame is the data rate A and a previous frame is the data rate B as show in FIG. 5. A method of determining this priority is not limited to the above-mentioned method. As described above, a method of determining the priority according to the generation rate of the data rate besides a method of sequentially determining the priority from the one near the latest data rate. For example, when an occurrence of the data rate A or the data rate D is 40% respectively, and an occurrence of the data rate B and the data rate C are 10%, respectively, the data rate A is selected in case that the data rate immediately before is the data rate A. Additionally, a priority can be decided by any methods.

Thereafter, the reception device controller 29 sets the candidate rate, to which priority n is set, to the target data rate (Hereafter, called as a test rate) by which the test whether it is the latest frame rate is performed (step ST14) after updating variable n (which is cleared to "0" in an initial state) to n+1 (step ST13).

The selection reception device controller 29 outputs data held in the buffer 22 after selecting the Viterbi decoder 24 corresponding to the test rate by the selector 23, and gives the reception data to the Viterbi decoder 24 only corresponding to the test rate (step ST15).

The Viterbi decoder 24 corresponding to the test rate performs the Viterbi decoding processing according to the test rate to the reception data. And, after the re-encoding processing (convolutional coding processing) according to the test rate is performed to the reception data after the Viterbi decoding processing by the re-encoder 25 which corresponds to the test rate, the symbol error rate is measured with the bit error counter 26 corresponding to this re-encoder 25. The reception data after the Viterbi decoding processing is performed is given to the buffer 28 through the frame error judgement unit 27, and is held in the buffer 28. In this case, the presence of the frame error is judged by the CRC check in the frame error judgement unit 27.

Then, the reception device controller 29 takes the symbol error rate measured with the bit error counter 26 which corresponds to the test rate and the judgment result in the frame error judgement unit 27 (step ST16), and judges whether or not the symbol error rate is smaller than the predetermined threshold (step ST17). For instance, the threshold is appropriately set to be able to distinguish these considering a permission value of the symbol error rate which can be occurred when the Viterbi decoding processing according to a correct data rate is performed and the symbol error rate which can be occurred when the Viterbi decoding processing according to the error data rate is performed.

The possibility whose test rate of current is the latest frame rate is high if the symbol error rate concerning the test rate is smaller than the threshold. Then, the reception device controller 29 judges whether it is judged that the frame error exists by the frame error judgement unit 27 (step ST18), and fixes the current test rate is the latest frame rate if there is no frame error. And, then, the reception device controller 29 outputs the decoding result in the Viterbi decoder 24 corresponding to the test rate to the buffer 28 by the reception data output control means 29e (step ST19), and ends a processing concerning one frame.

On the other hand, when the symbol error rate concerning the test rate is larger than the threshold or the frame error occurs, the reception device controller 29 judges the current test rate differs from the latest frame rate. And, in this case, the reception device controller 29 sets all the candidate rates in the test rate and judges whether the above-mentioned processing is performed (step ST20), and performs the above-mentioned processing such that the untest candidate rate is the test rate and performs the by repeating the processing of step ST13 or after if there is a candidate rate which has not been set in the test rate yet. When the above-mentioned processing has already been performed such that all the candidate rates are assumed to be a test rate, the reception device controller 29 ends processing concerning one frame.

Among the above-mentioned processings, step ST14 to step ST18 are executed respectively by the data rate judgment means 29c and step ST13 and step ST20 are executed by the data rate judgment control means 29d.

The candidate of the latest frame rate is as mentioned above enabled to be narrowed a part of all the data rates with the reception device 2 by changing the used data rate in stages the transmission device 1 according to the embodiment. And, the priority is set to the narrowed each candidate rate with the reception device 2, the test processing whether the candidate rate is a correct data rate is performed one by one according to the priority.

Therefore, a correct data rate can be judged only by performing a very few test processing if the priority set with the reception device 2 is fairly appropriate. And, since the Viterbi decoding processing is included in this test processing, the Viterbi decoding processing can be executed with very few times, too. Since the test processing of all the data rates is not performed even if the priority set with the reception device 2 is improper, it is possible to decrease the number of times of execution of the test processings, that is, the number of times of the Viterbi decoding processings comparing with conventional ones. As a result, a time to require until the Viterbi decoding processing is completed according to a correct data rate can be shortened, the electric power consumption can be decreased, and the correctly decoded reception data by the Viterbi decoding can be obtained, exactly.

(Second Embodiment)

Figure 6:
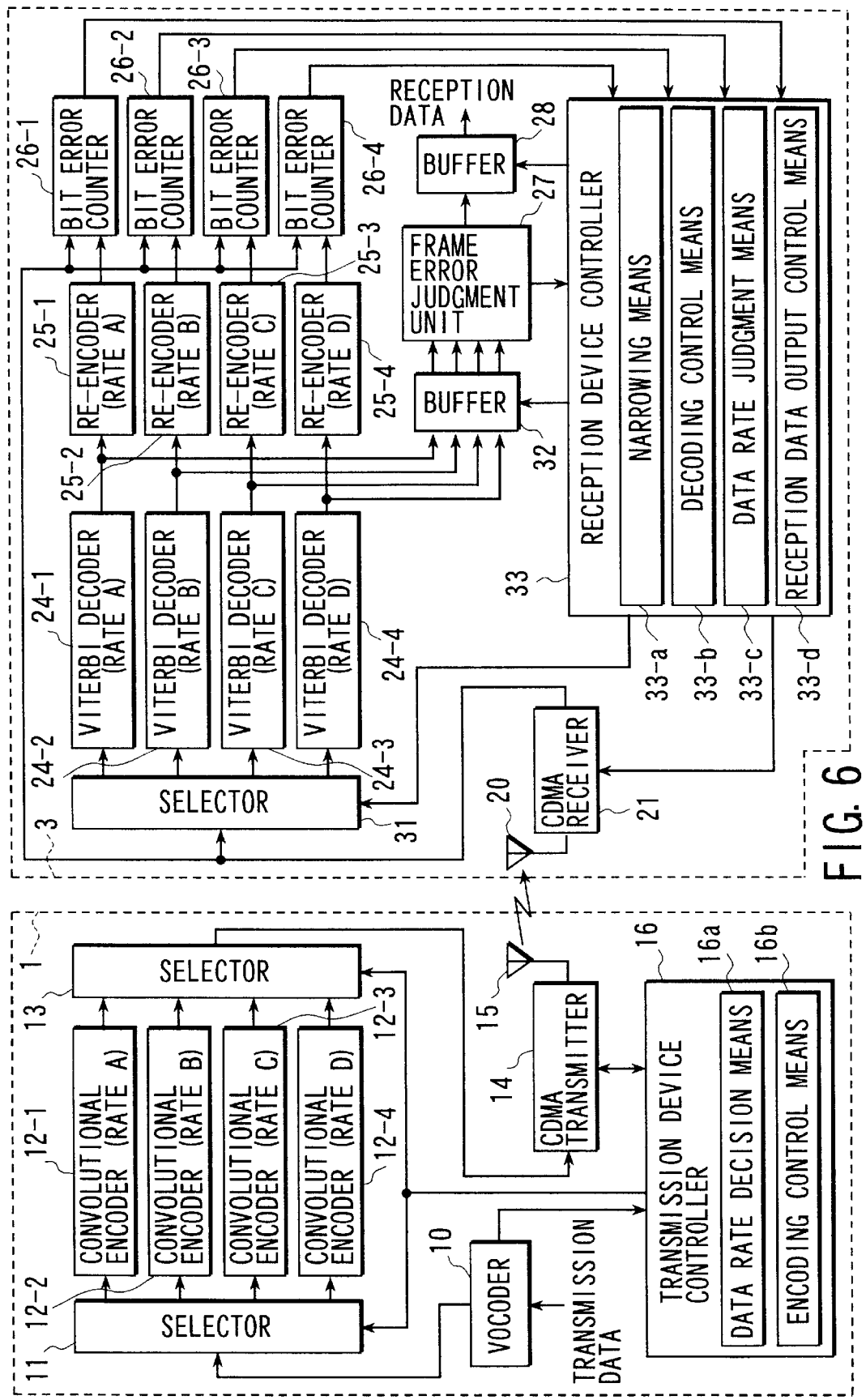
FIG. 6 is a function block diagram showing a main structure of a CDMA wireless communication system constructed by applying a communication system according to the second embodiment of the present invention.

FIG. 6 is a function block diagram showing a main structure of a CDMA wireless communication system constructed by applying a communication system according to the second embodiment of the present invention. The same reference symbol is used to the same part as FIG. 1, and the detailed explanation will be omitted.

This CDMA wireless communication system performs a wireless communication by a CDMA method between a transmission device 1 and a reception device 3. That is, the transmission device 1 is the same as the first embodiment, and the reception device 3 is replaced from the reception device 2 in the first embodiment.

The reception device 3 has an antenna 20, a CDMA receiver 21, Viterbi decoders 24 (24-1 to 24-4), re-encoders 25 (25-1 to 25-4) bit error counters 26, (26-1 to 26-4), a frame error judgement unit 27, a buffer 28, a selector 31, a buffer 32, and a reception device controller 33.

The reception device 3 excludes the buffer 22 in the reception device 2 of the first embodiment, and the selector 31 and the reception device controller 33 are provided in place of the selector 23 and the reception device controller 29, and, in addition, the buffer 32 is newly arranged between each Viterbi decoder 24 and the frame error judgement unit 27.

The selector 31 arbitrarily selects the Viterbi decoders 24-1 to 24-4 under the control of the reception device controller 33, and can select a plurality of Viterbi decoders 24 simultaneously. And, the selector 31 gives the reception data given by the CDMA receiver 21 to the selected Viterbi decoders 24, respectively.

The buffer 32 holds the reception data given from each of the Viterbi decoders 24-1 to 24-4 until the reception data of the following frame is given. And, the buffer 32 gives one of the held reception data to the frame error judgement unit 27 under the control of the reception device controller 33.

The reception device controller 33 achieves an operation as the reception device by totally controlling each section of the reception device 3. The reception device controller 33 has a microphone processor for example as a main control circuit, and has narrowing means 33a decoding control means 33b, data rate judgment means 33c, and reception data output control means 33d, in addition to well-known control means to enable the wireless communication by the CDMA method.

The narrowing means 33a narrows the candidate rates of the latest frame rate to a part of the data rate A to the data rate D based on the previous frame rate to which a previous frame is judged by the data rate judgment means 33c. The decoding control means 33b performs the Viterbi decoding processing to the Viterbi decoders 24 respectively corresponding to the candidate rates narrowed by the narrowing means 33a, respectively. The data rate judgment means 33c judges the latest frame rate among the candidate rates based on a symbol error rate measured with the bit error counter 26 and a judgment result of the frame error judgement unit 27. And, the reception data output control means 33d outputs the reception data held in the buffer 28 when the latest frame rate is judged by the data rate judgment means 33c.

Next, an operation of the reception device 3 in the CDMA wireless communication system as constructed above will be explained.

When an electric wave transmitted from the transmission device 1 reaches the reception device 3, the electric wave is received with antenna 20 to be converted into an electric reception signal, and is given to the CDMA receiver 21. And, the reception processing of such as a digital demodulation and a spectrum reverse-diffusion processing are performed to the reception signal by the CDMA receiver 21 to become a reception data.

Figure 7:
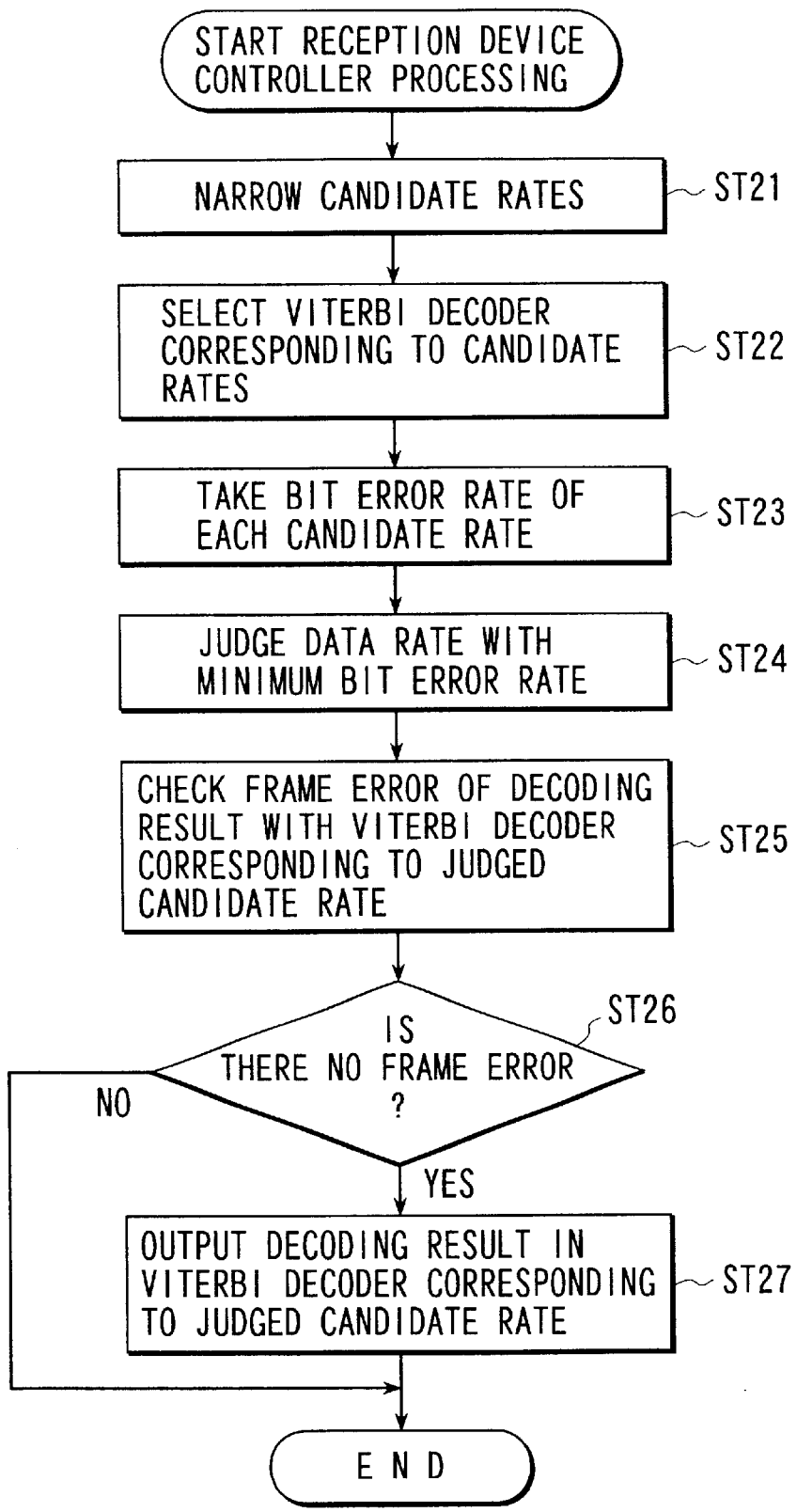
FIG. 7 is a flowchart showing a processing procedure of the reception device controller 33 in FIG. 6.

By the way, the reception device controller 33 judges the data rate used with the following frame (latest frame) whenever processing concerning one frame ends, and executes the processing shown in FIG. 7 to obtain the correct reception data to which the Viterbi decoding according to the data rate is performed.

The reception device controller 33, first, narrows the candidate rates of the latest frame rate to a part of the data rate A to the data rate D by the narrowing means 33a based on the previous frame rate (step ST21). That is, it is used that the transmission device 1 selects the latest frame rate from the same data rate as the previous frame rate, or different data rate from the previous frame rate only by one stage, the same data rate as the previous frame rate, or different data rate from the previous frame rate only by one stage are assumed to be candidate rates.

Next, the decoding control means 33b selects all of the Viterbi decoders 24 corresponding to each candidate rate under the control of the reception device controller 33.

Then, the reception data as mentioned above obtained by the CDMA receiver 21 is given to the respective Viterbi decoders 24 corresponding to each candidate rate, and the Viterbi decoding processing according to each candidate rate is performed to the reception data, respectively. And, after the re-encode processing (convolutional coding processing) according to the test rate is performed by the re-encoder 25 corresponding to the test rate, the measurement of the symbol error rate of the reception data after the Viterbi decoding processing is performed with the bit error counter 26 corresponding to the re-encoder 25. The reception data after the Viterbi decoding processing is performed is given to the buffer 32, respectively, and is held therein.

Then, the reception device controller 33 takes the symbol error rates measured with the bit error counter 26 corresponding to the test rate (step ST23), compares these symbol error rates, and judges that the candidate rate with a minimum symbol error rate is a reception data (step ST24).

Subsequently, the reception device controller 33 makes the reception data decoded by the Viterbi decoder 24 corresponding to the candidate rate judged in step ST24 output to the buffer 32, and makes the frame error judgement unit 27 judge the presence of the frame error (step ST25). The reception data output from the buffer 32 is given to the buffer 28 through the frame error judgement unit 27, and held therein.

The reception device controller 33 takes the judgment result in the frame error judgement unit 27, and judges whether or not the frame error exists (step ST26).

The reception device controller 33 outputs the reception data held in the buffer 28 that is, the reception data after the Viterbi decoding processing is performed by the Viterbi decoder 24 corresponding to the latest frame rate by the reception data output control means 33d if there is no frame error (step ST27).

On the other hand, when the frame error occurs, the reception device controller 33 judges that it is impossible to obtain the correct reception data because of occurring the burst-error etc., and ends a processing concerning one frame without outputting the reception data from the buffer 28.

Step ST23 to step ST26 are executed by the data rate judgment means 33c among the above-mentioned processing.

The candidate of the latest frame rate is as mentioned above enabled to be narrowed a part of all the data rates with the reception device 2 by changing the used data rate in stages the transmission device 1 according to the embodiment. And, the Viterbi decoding processing, the re-encode processing, and the measurement processing of the symbol error rate corresponding to each of the narrowed candidate rates, respectively, are performed to the reception data with the reception device 3, respectively, if the frame error does not occur in the reception data to which the Viterbi decoding processing corresponding to the candidate rate to which this symbol error rate is minimized, is performed, the candidate rate is judged a correct data rate, and the reception data is output as valid data.

Therefore, since the Viterbi decoding processing of all the data rates is not performed, it is unnecessary to operate all of the Viterbi decoders 24, the electric power consumption can be decreased, and the correctly decoded reception data by the Viterbi decoder can be exactly obtained.

(Third Embodiment)

Figure 8:
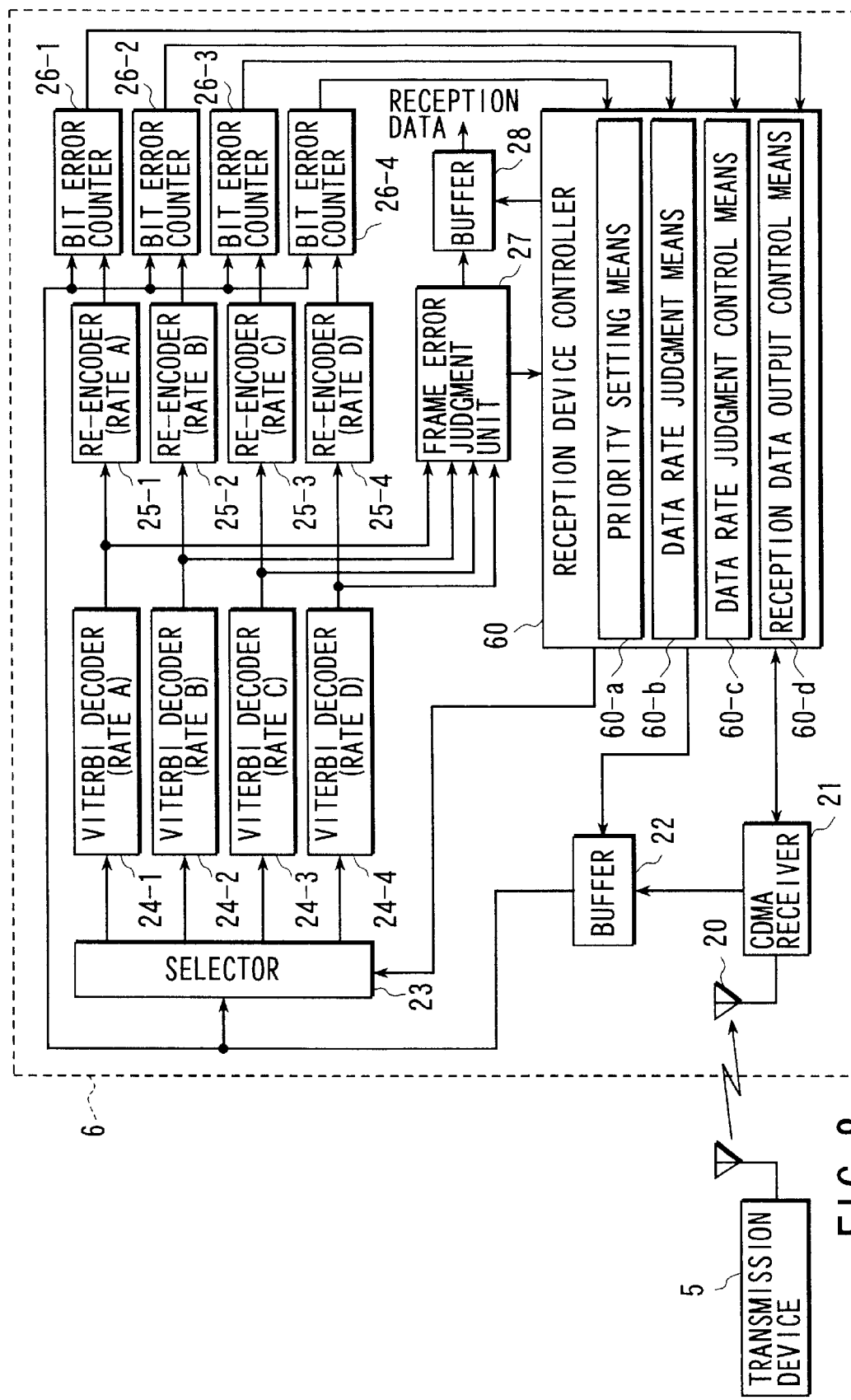
FIG. 8 is a function block diagram showing a main structure of a CDMA wireless communication system constructed by applying a communication system according to the third embodiment of the present invention.

FIG. 8 is a function block diagram showing a main structure of a CDMA wireless communication system constructed by applying a communication system according to the first embodiment of the present invention. The same reference symbol is used to the same part as FIG. 1, and the detailed explanation will be omitted.

This CDMA wireless communication system performs a wireless communication by a CDMA method between a transmission device 5 and a reception device 6.

The transmission device 5 does not have a function to change the data rate of the transmission device 1 in the first above-mentioned embodiment in stages, and, for example, is a device which has been used from the past.

The reception device 6 has an antenna 20, a CDMA receiver 21, a buffer 22, a selector 23, Viterbi decoders 24 (24-1 to 24-4), re-encoders 25 (25-1 to 25-4), bit error counters 26 (26-1 to 26-4), a frame error judgement unit 27, a buffer 28, and a reception device controller 60.

The reception device 6 comprises a reception device controller 60 in place of the reception device controller 29 in the reception device 2 in the first embodiment.

The reception device controller 60 achieves an operation as the reception device by totally controlling each section of the reception device 6. The reception device controller 60 has, for example, a microphone processor as a main control circuit, and has priority setting means 60a, data rate judgment means 60b, data rate judgment control means 60c, and reception data output control means 60d in addition to well-known control means to enable the wireless communication by the CDMA method.

The priority setting means 60a sets respective priorities of all the data rates in consideration of the change state of the data rate in past frames. The data rate judgment means 60b assumes one of the data rates to be a test rate, and judges whether the test rate is the latest frame rate based on the symbol error rate measured with the bit error counter 26 when the reception data is flown into the Viterbi decoder 24 and the re-encoder 25 which correspond to the test rate, and the bit error counter 26 which corresponds to the re-encoder 25 and the judgment result of the frame error judgement unit 27. The data rate judgment control means 60c makes the judgment processing by the data rate judgment means 60b perform one by one until the latest frame rate is judged with changing the data rate assumed to be a test rate set by the priority setting means 60a according to the priority. And, the reception data output control means 60d makes the reception data held in buffer 28 output when the latest frame rate is judged by the data rate judgment means 60b.

Next, an operation of the CDMA wireless communication system as constructed above will be explained.

When an electric wave transmitted from the transmission device 5 reaches the reception device 6, the electric wave is received with antenna 20 to be converted into an electric reception signal, and is given to the CDMA receiver 21. And, the reception processing of such as a digital demodulation and a spectrum reverse-diffusion processing are performed to the reception signal by the CDMA receiver 21 to become a reception data.

Figure 9:
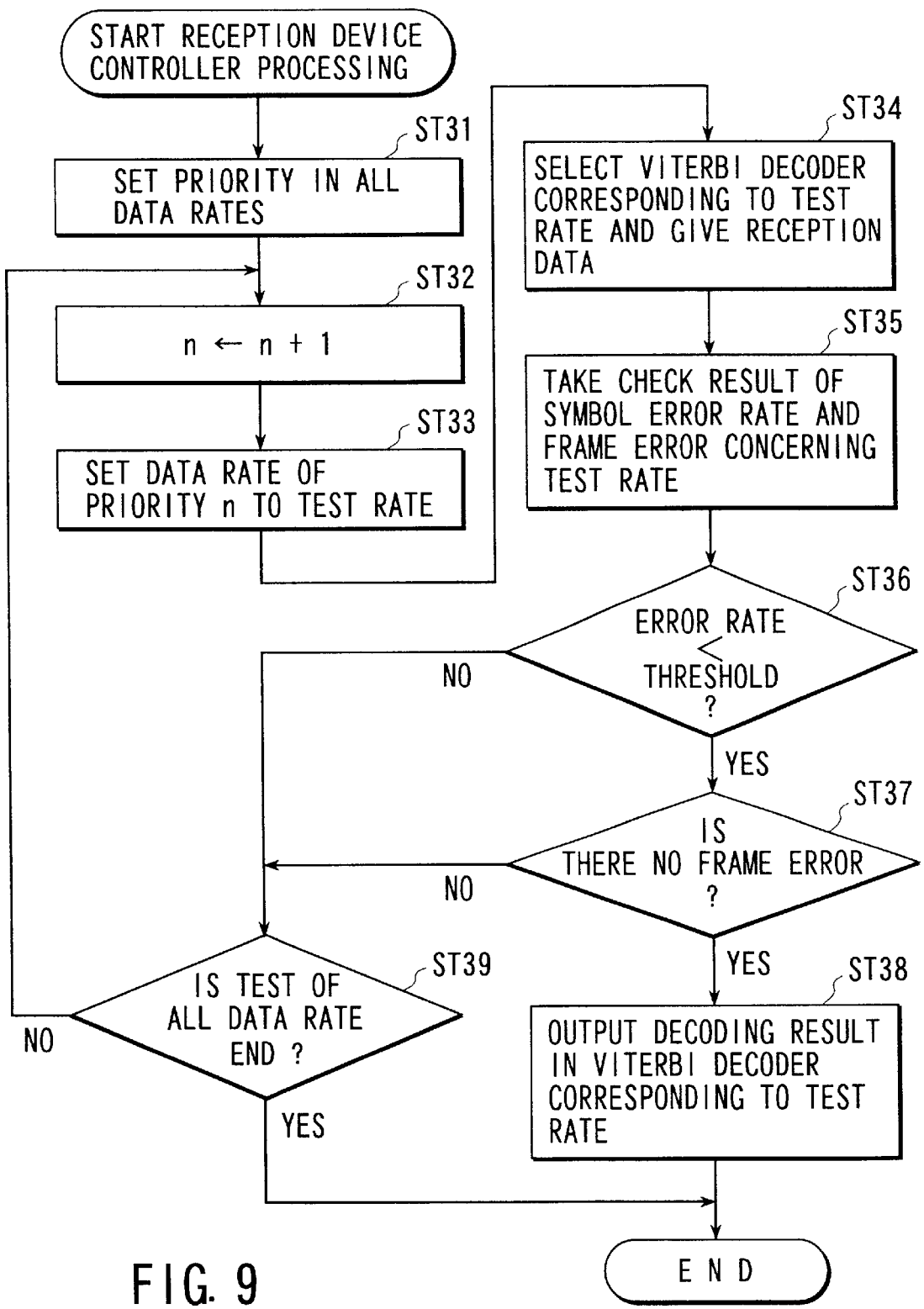
FIG. 9 is a flowchart showing a processing procedure of the reception device controller 60 in FIG. 8.

The reception device controller 60 judges a data rate used with the frame whenever the reception data of one frame is received, and executes a processing shown in FIG. 9 to obtain correct reception data to which the Viterbi decoding according to the data rate is performed.

The reception device controller 60, first, sets the respective priorities of all the data rates by the priority setting means 60a in consideration of the change state of the data rate in a past frame (step ST31).

Subsequently, after variable n (cleared to "0" in the initial state) is updated to [n+1] (step ST32), the reception device controller 60 sets a data rate, to which a priority n is set, as a test rate (step ST33).

Thereafter, the reception device controller 60 makes the data held in the buffer 22 output after selecting a Viterbi decoder 24 corresponding to the test rate by the selector 23, and gives the reception data to only the Viterbi decoder 24 corresponding to the test rate (step ST34).

Then, the Viterbi decoding processing according to the test rate is performed to the reception data by the Viterbi decoder 24 corresponding to the test rate. After the re-encode processing (convolutional coding processing) according to the test rate is performed by the re-encoder 25 which corresponds to the test rate, the symbol error rate is measured with the bit error counter 26 corresponding to the re-encoder 25 as for the reception data after the Viterbi decoding processing is performed. The reception data after the Viterbi decoding processing is performed is given to the buffer 28 through the frame error judgement unit 27, and held therein. In this case, the presence of the frame error is judged by the CRC check in the frame error judgement unit 27.

Then, the reception device controller 60 takes the symbol error rate measured with the bit error counter 26 which corresponds to the test rate and the judgment result in the frame error judgement unit 27 (step ST35), and, first, judges whether the symbol error rate is smaller than the predetermined threshold (step ST36). For instance, the threshold is appropriately set to be able to distinguish a permission value of a symbol error rate which can be occurred when the Viterbi decoding processing according to a correct data rate is performed and a symbol error rate which can be occurred when the Viterbi decoding processing according to the error data rate is performed by considering these symbol error rates.

A possibility that a current test rate is the latest frame rate is high if a symbol error rate concerning the test rate is smaller than the threshold. Then, the reception device controller 60 judges whether the frame error judgement unit 27 judges the frame error exists (step ST37), and fixes the current test rate as the latest frame rate if there is no frame error. The reception device controller 60 makes the decoding result in the Viterbi decoder 24 corresponding to the test rate output to the buffer 28 by the reception data output control means 60d (step ST38), and ends processing concerning one frame.

On the other hand, when the symbol error rate concerning the test rate is larger than the threshold or the frame error occurs, the reception device controller 60 judges the current test rate is different from the latest frame rate. In this case, the reception device controller 60 sets all the data rates in a test rate and judges whether the above-mentioned processing has been performed (step ST39), then, sets an untest data rate as the test rate by repeating the processings step ST32 or later and performs the above-mentioned processing if there is a candidate rate which has not been set in the test rate. When all the data rates have already been assumed to be a test rate and the above-mentioned processing is performed, the reception device controller 60 ends processing concerning one frame.

Step ST33 to step ST37 are executed by the data rate judgment means 60b, and step ST32 and step ST39 is executed by the data rate judgment control means 60c among the above-mentioned processings.

As mentioned above, according to the embodiment, the priority is set to all the data rates, and the test processing whether the candidate rate is a correct data rate is performed one by one in the reception device 6 according to the priority.

Therefore, a correct data rate can be judged only by the very few times of the test processings, if the priority set with the reception device 6 is fairly appropriate. And, since the Viterbi decoding processing is included in the test processing, the execution of the Viterbi decoding processing is settled with very few times, too. As a result, a time for requiring to complete the Viterbi decoding processing according to a correct data rate can be shortened, the electric power consumption can be decreased, and the correctly decoded reception data of the Viterbi decoding can be exactly obtained.

According to the embodiment, it is unnecessary to change the transmission device as the first embodiment and the second embodiment, and it is possible to easily achieve only by changing the structure on the reception side.

The present invention is not limited to each of the embodiments. In each embodiment, for example, though it is assumed the convolutional encoder 12, the Viterbi decoder 24, the re-encoder 25, and the bit error counter 26 corresponding to each data rate, respectively, are prepared, devices that processing according to each data rate can be performed variable may be prepared, and, a processing according to each data rate for the time-division may be performed.

In each of the embodiments, though the latest frame rate is judged by considering the presence of the frame error, since it is possible to judge the latest frame rate according to the symbol error rate with high accuracy, it may be unnecessary to reflect the presence of the frame error in the judgment of the latest frame rate.

In each of the embodiments, though the data rate is assumed to be four kinds, the present invention can be applied also to the system with different number of data rates.

Various modifications can be executed within a scope of the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A variable rate communication system comprising:
    a transmission device capable of selectively using one of a predetermined plurality of data rates for each frame determined in stages; and
    a reception device capable of receiving data transmitted by said plurality of data rates, wherein
    said transmission device comprises:
        data rate decision means decides a data rate used with the latest frame to one of data rates used with a frame immediately before and a different data rate from a data rate used with the frame immediately before by one stage; and
        encoding means for performing a predetermined encoding processing according to the data rate decided by said data rate decision means to a transmission data, and
    said reception device comprises:
        decoding means for performing a predetermined decoding processing according to said plurality of data rates to a reception data, respectively;
        narrowing means for narrowing candidates of the data rates used with a received latest frame to a part of said plurality of data rates based on a data rate at least used with a frame immediately before;
        judgment processing means for performing a predetermined judgment processing to judge a data rate used with said latest frame as valid data rates for narrowed data rates; and
        reception data selection means for selecting a reception data to which a decoding processing according to a data rate judged by said judgment processing means is performed by said decoding means as a valid reception data.

2. The variable rate communication system according to claim 1, wherein said encoding means performs the encoding processing of said reception data by a data rate judged as a valid data rate by said data rate decision means.

3. The variable rate communication system according to claim 1, wherein said data rate decision means judges whether it is necessary to change a latest data rate, and decides one of the data rates of the one stage high rank or one stage low rank from the latest data rate as a transmission data rate if the change in the latest data rate is necessary.

4. The variable rate communication system according to claim 1, wherein said judgment processing means comprises:

priority setting means for setting a priority to the data rates narrowed by said narrowing means;

re-encoding means for performing said encoding processing according to each of said plurality of data rates to the reception data after the decoding processing according to the same data rate is performed by said decoding means, respectively;

data rate judgment means for obtaining an error rate to the received data before decoding by said decoding means regarding to re-encoded data re-encoded by said re-encoding means, and for judging a data rate corresponding to the encoding processing performed to obtain the re-encoded data as a data rate which is used with the latest frame when this error rate is smaller than a predetermined value; and data rate judgment control means for setting one of the data rates narrowed by said narrowing means in a test rate, and for making a decoding processing and a re-encoding processing according to the test rate, and a judgment processing by said data rate judgment means until the data rate used with the latest frame is judged by said data rate judgment means with changing in order with a high priority to which the data rate to be a test rate is set by said priority setting means.

5. The variable rate communication system according to claim 4, wherein said priority setting means for setting a priority based on a change state of a data rate in a past frame.

6. The variable rate communication system according to claim 4, wherein said priority setting means for setting a priority based on an occurrence of a data rate in a past frame.

7. The variable rate communication system according to claim 4, wherein said judgment processing means comprises frame error judgment means for judging a presence of a frame error in the reception data after being decoded by said decoding means, and said data rate judgment means judges that a data rate corresponding to the re-encode processing performed to obtain the re-encoded data whose error rate to a previous reception data decoded by said decoding means is smaller than a predetermined value is a data rate used with the latest frame.

8. The variable rate communication system according to claim 7, wherein said data rate judgment means judges that a data rate corresponding to the decoding processing performed to obtain the reception data judged that there is no frame error according to said frame error judgment means is a data rate used with the latest frame.

9. The variable rate communication system according to claim 1, wherein said judgment processing means comprises:

decoding control means for performing a decoding processing according to the data rates narrowed by said narrowing means to said decoding means;

re-encoding means for performing an encoding processing according to each of said plurality of data rates to the reception data after the decoding processing according to the same data rate is performed by said decoding means, respectively;

data rate judgment means for obtaining an error rate to the received data before decoding by said decoding means regarding to the re-encoded data re-encoded by said re-encoding means, and for judging a data rate corresponding to the encoding processing performed to obtain the re-encoded data as a data rate which is used with the latest frame when this error rate is smaller than a predetermined value.

10. The variable rate communication system according to claim 9, wherein said decoding means decodes the reception data at the same time by the data rates narrowed by said narrowing means;

said judgment processing means judges that a data rate having the smallest error rate in the decoded reception data is a valid data rate.

11. The variable rate communication system according to claim 9, wherein said judgment processing means comprises frame error judgment means for judging a presence of a frame error in the reception data after being decoded by said decoding means, and said data rate judgment means judges that a data rate corresponding to the re-encode processing performed to obtain the re-encoded data whose error rate to a previous reception data decoded by said decoding means is smaller than a predetermined value is a data rate used with the latest frame.

12. The variable rate communication system according to claim 11, wherein said data rate judgment means judges that a data rate corresponding to the decoding processing performed to obtain the reception data judged that there is no frame error according to said frame error judgment means is a data rate used with the latest frame.

13. The variable rate communication system according to claim 1, wherein said narrowing means makes a data rate used with the frame immediately before and a different data rate for the data rate used with the frame immediately before by one stage candidates of data rates used with the received latest frame.

14. A reception device, which receives a frame transmitted from a transmission device which is selectively usable in one of a plurality of predetermined data rates defined in stages for each frame, comprising:

decoding means for performing a predetermined decoding processing according to said plurality of data rates to a reception data, respectively;

narrowing means for narrowing candidates of the data rates used with a received latest frame to a part of said plurality of data rates based on a data rate at least used with a frame immediately before;

judgment processing means for performing a predetermined judgment processing to judge a data rate used with said latest frame for data rates narrowed by said narrowing means; and reception data selection means for selecting a reception data to which a decoding processing according to a data rate judged by said judgment processing means is performed by said decoding means as a valid reception data.

15. A reception device, which receives a frame transmitted from a transmission device which is selectively usable one of a plurality of predetermined data rates defined in stages for each frame, comprising:

priority setting means for setting a priority to the data rates narrowed by a narrowing means;

decoding means for performing a predetermined decoding processing according to each of said plurality of data rates to the reception data, respectively;

re-encoding means for performing said encoding processing according to each of said plurality of data rates to the reception data after decoding processing according to the each of said plurality of data rates is performed by said decoding means, respectively;

data rate judgment means for obtaining an error rate to received data before decoding by said decoding means regarding to re-encoded data re-encoded by said re-encoding means, and for judging a data rate corresponding to the encoding processing performed to obtain the re-encoded data as a data rate which is used with the latest frame when this error rate is smaller than a predetermined value;

data rate judgment control means for setting one of said plurality of data rates in a test rate, and for making a decoding processing and a re-encoding processing according to the test rate, and a judgment processing by said data rate judgment means until the data rate used with the latest frame is judged by said data rate judgment means with changing in order with a high priority to which the data rate to be a test rate is set by said priority setting means; and reception data selection means for selecting a reception data to which a decoding processing according to a data rate judged by said judgment processing means is performed by said decoding means as a valid reception data.

16. A variable rate communication system comprising:

a transmission device capable of selectively using one of a predetermined plurality of data rates for each frame determined in stages; and a reception device capable of receiving data transmitted by said plurality of data rates, wherein said transmission device comprises:
a data rate decision circuit that decides a data rate to be used with the latest frame to one of data rates used with a frame immediately before and a different data rate from a data rate used with the frame immediately before by one stage; and
an encoder for performing a predetermined encoding processing according to the data rate decided by said data rate decision circuit to a transmission data, and said reception device comprises:
a decoder for performing a predetermined decoding processing according to said plurality of data rates to a reception data, respectively;
a candidate narrowing circuit for narrowing candidates of the data rates used with a received latest frame to a part of said plurality of data rates based on a data rate at least used with a frame immediately before;
a judgment processor for performing a predetermined judgment processing to judge a data rate used with said latest frame as valid data rates for narrowed data rates; and
a reception data selection circuit for selecting a reception data to which a decoding processing according to a data rate judged by said judgment processor is performed by said decoder as valid reception data.

17. The variable rate communication system according to claim 16, wherein said encoder performs the encoding processing of said reception data by a data rate judged as a valid data rate by said data rate decision circuit.

18. The variable rate communication system according to claim 16, wherein said data rate decision circuit judges whether it is necessary to change a latest data rate, and decides one of the data rates or the one stage high rank or one stage low rank from the latest data rate as a transmission data rate if the change in the latest data rate is necessary.

19. The variable rate communication system according to claim 16, wherein said judgment processor comprises:

a priority setting circuit for setting a priority to the data rates narrowed by said candidate narrowing circuit;

a re-encoder for performing said encoding processing according to each of said plurality of data rates to the reception data after the decoding processing according to the same data rate is performed by said decoder, respectively;

data rate judgment circuit for obtaining an error rate to the received data before decoding by said decoder regarding to re-encoded data re-encoded by said re-encoder, and for judging a data rate corresponding to the encoding processing performed to obtain the re-encoded data as a data rate which is used with the latest frame when this error rate is smaller than a predetermined value; and data rate judgment control circuit for setting one of the data rates narrowed by said candidate narrowing circuit in a test rate, and for making a decoding processing and a re-encoding processing according to the test rate, and a judgment processing by said data rate judgment circuit until the data rate used with the latest frame is judged by said data rate judgment circuit with changing in order with a high priority to which the data rate to be a test rate is set by said priority setting circuit.

20. The variable rate communication system according to claim 19, wherein said priority setting circuit for setting a priority based on a change state of a data rate in a past frame.

21. The variable rate communication system according to claim 19, wherein said priority setting circuit for setting a priority based on an occurrence of a data rate in a past frame.

22. The variable rate communication system according to claim 19, wherein said judgment processor comprises a frame error judgment circuit for judging a presence of a frame error in the reception data after being decoded by said decoder, and said data rate judgment circuit judges that a data rate corresponding to the re-encode processing performed to obtain the re-encoded data whose error rate to a previous reception data decoded by said decoder is smaller than a predetermined value is a data rate used with the latest frame.

23. The variable rate communication system according to claim 22, wherein said data rate judgment circuit judges that a data rate corresponding to the decoding processing performed to obtain the reception data judged that there is no frame error according to said frame error judgment circuit is a data rate used with the latest frame.

24. The variable rate communication system according to claim 16, wherein said judgment processor comprises:
a decoding controller for performing a decoding processing according to the data rates narrowed by said candidate narrowing circuit to said decoder;
a re-encoder for performing an encoding processing according to each of said plurality of data rates to the reception data after the decoding processing according to the same data rate is performed by said decoder, respectively;
a data rate judgment circuit for obtaining an error rate to the received data before decoding by said decoder regarding to the re-encoded data re-encoded by said re-encoder, and for judging a data rate corresponding to the encoding processing performed to obtain the re-encoded data as a data rate which is used with the latest frame when this error rate is smaller than a predetermined value.

25. The variable rate communication system according to claim 24, wherein
said decoder decodes the reception data at the same time by the data rates narrowed by said candidate narrowing circuit;
said judgment processor judges that a data rate having the smallest error rate in the decoded reception data is a valid data rate.

26. The variable rate communication system according to claim 24, wherein
said judgment processor comprises a frame error judgment circuit for judging a presence of a frame error in the reception data after being decoded by said decoder, and
said data rate judgment circuit judges that a data rate corresponding to the re-encode processing performed to obtain the re-encoded data whose error rate to a previous reception data decoded by said decoder is smaller than a predetermined value is a data rate used with the latest frame.

27. The variable rate communication system according to claim 26, wherein said data rate judgment circuit judges that a data rate corresponding to the decoding processing performed to obtain the reception data judged that there is no frame error according to said frame error judgment circuit is a data rate used with the latest frame.

28. The variable rate communication system according to claim 16, wherein said candidate narrowing circuit makes a data rate used with the frame immediately before and a different data rate for the data rate used with the frame immediately before by one stage candidates of data rates used with the received latest frame.

29. A reception device, which receives a frame transmitted from a transmission device which is selectively usable in one of a plurality of predetermined data rates defined in stages for each frame, comprising:
a decoder for performing a predetermined decoding processing according to said plurality of data rates to a reception data, respectively;
a candidate narrowing circuit for narrowing candidates of the data rates used with a received latest frame to a part of said plurality of data rates based on a data rate at least used with a frame immediately before;
a judgment processor for performing a predetermined judgment processing to judge a data rate used with said latest frame for data rates narrowed by said candidate narrowing circuit; and
a reception data selection circuit for selecting a reception data to which a decoding processing according to a data rate judged by said judgment processor is performed by said decoder as a valid reception data.

30. A reception device, which receives frame transmitted from a transmission device which is selectively usable one of a plurality of predetermined data rates defined in stages for each frame, comprising:
priority setting circuit for setting a priority to the data rates narrowed by a candidate narrowing circuit;
a decoder for performing a predetermined decoding processing according to each of said plurality of data rates to the reception data, respectively;
re-encoder for performing said encoding processing according to each of said plurality of data rates to the reception data after decoding processing according to the each of said plurality of data rates is performed by said decoder, respectively;
a data rate judgment circuit for obtaining an error rate to received data before decoding by said decoder regarding to re-encoded data re-encoded by said re-encoder, and for judging a data rate corresponding to the encoding processing performed to obtain the re-encoded data as a data rate which is used with the latest frame when this error rate is smaller than a predetermined value;
a data rate judgment control circuit for setting one of said plurality of data rates in a test rate, and for making a decoding processing and a re-encoding processing according to the test rate, and a judgment processing by said data rate judgment circuit until the data rate used with the latest frame is judged by said data rate judgment circuit with changing in order with a high priority to which the data rate to be a test rate is set by said priority setting circuit; and
a reception data selection circuit for selecting a reception data to which a decoding processing according to a data rate judged by said judgment processor is performed by said decoder as a valid reception data.

* * * * *

UNITED STATES PATENT AND TRADEMARK OFFICE
CERTIFICATE OF CORRECTION

PATENT NO. : 6,400,731 B1
DATED : June 4, 2002
INVENTOR(S) : Tatsuo Nitta

It is certified that error appears in the above-identified patent and that said Letters Patent is hereby corrected as shown below:

Column 15,
Line 10, ";" has been replaced with -- . --.

Column 17,
Line 65, "or" has been replaced with -- of --.

Column 18,
Line 9, ";" has been replaced with -- . --.

Column 20,
Line 9, -- a -- has been inserted before "frame transmitted".

Signed and Sealed this

Eighteenth Day of February, 2003

JAMES E. ROGAN
*Director of the United States Patent and Trademark Office*